United States Patent [19]

Guibert

[11] 4,381,442
[45] Apr. 26, 1983

[54] COUNTER-TOP UNIT FOR HEATING PACKAGED FOOD

[75] Inventor: Raul Guibert, Los Angeles, Calif.

[73] Assignee: Sunset Ltd., Los Angeles, Calif.

[21] Appl. No.: 277,027

[22] Filed: Jun. 24, 1981

Related U.S. Application Data

[60] Continuation-in-part of Ser. No. 221,208, Dec. 30, 1980, Pat. No. 4,327,279, which is a continuation-in-part of Ser. No. 97,787, Nov. 27, 1979, Pat. No. 4,307,286, said Ser. No. 97,787, is a continuation-in-part of Ser. No. 971,381, Dec. 20, 1978, Pat. No. 4,326,497, which is a division of Ser. No. 809,775, Jun. 24, 1977, Pat. No. 4,132,216.

[51] Int. Cl.³ .............................................. H05B 1/00
[52] U.S. Cl. ................................ 219/400; 126/21 A; 126/261; 219/371; 219/386; 312/236; 165/104.34
[58] Field of Search ................ 219/369, 370, 371, 372, 219/400, 401, 385, 386, 388; 126/21 A, 110 A, 261, 268, 285 B, 248; 312/236; 99/355, 447, 474; 186/1 R; 165/107 R; 206/499; 220/DIG. 13

[56] References Cited

U.S. PATENT DOCUMENTS

| | | | |
|---|---|---|---|
| 4,010,341 | 3/1977 | Ishammar | 219/400 |
| 4,038,968 | 8/1977 | Rovell | 126/261 |
| 4,089,322 | 5/1978 | Guibert | 126/261 |
| 4,132,216 | 1/1979 | Guibert | 219/400 X |
| 4,323,110 | 6/1982 | Rubbright et al. | 219/400 X |

FOREIGN PATENT DOCUMENTS 331593  7/1930  United Kingdom ................ 219/400

Primary Examiner—Volodymyr Y. Mayewsky
Attorney, Agent, or Firm—Michael Ebert

[57] ABSTRACT

A counter-top unit for heating packages containing pre-cooked cold food, the unit acting to rapidly heat up the food to a service temperature level and to thereafter maintain this level. The unit includes a case having an apertured partition therein to form a compartment accessible from the front of the case for accommodating a stack of food packages with air-flow spaces therebetween. The compartment is spaced from the rear of the case to define a plenum and from the front to define an air curtain passage communicating with upper and lower air passages leading to the plenum. In operation, air drawn from the upper passage is heated and blown into the plenum to create a pressure differential between the plenum and the compartment, as a result of which the heated air is forced through the partition into the spaces between the packages to heat the food therein, the heated air also flowing in a continuous loop about the compartment through the passages to thermally isolate the compartment. In the heat-up phase, the heated air takes the form of a pulsatory wave in which the pulses are at a temperature above the service level separated by lower temperature intervals during which heat from the outer layer of the food is transferred into the body thereof to prevent the food from being heated above the service level. In the subsequent service phase, the temperature of the air is held at the service temperature level.

11 Claims, 14 Drawing Figures

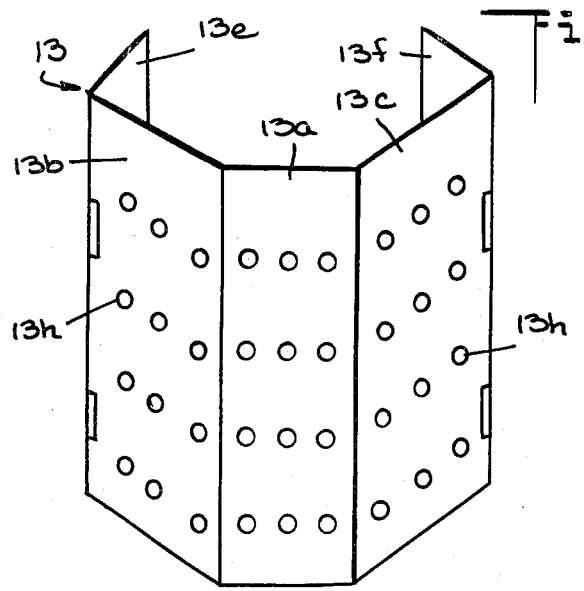
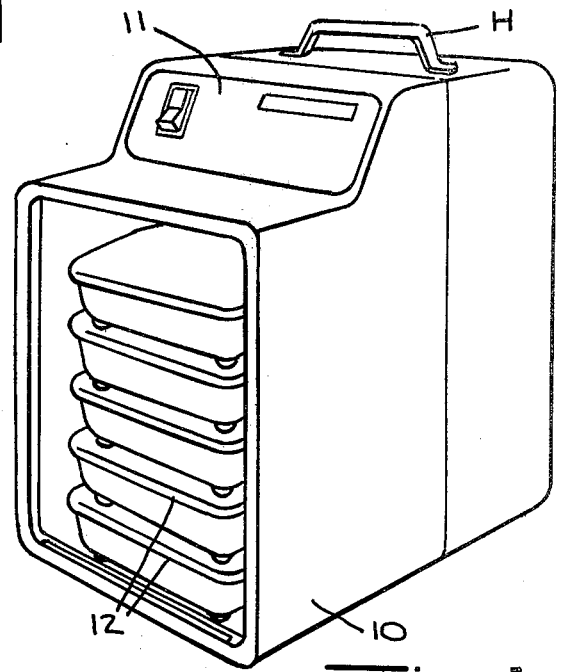
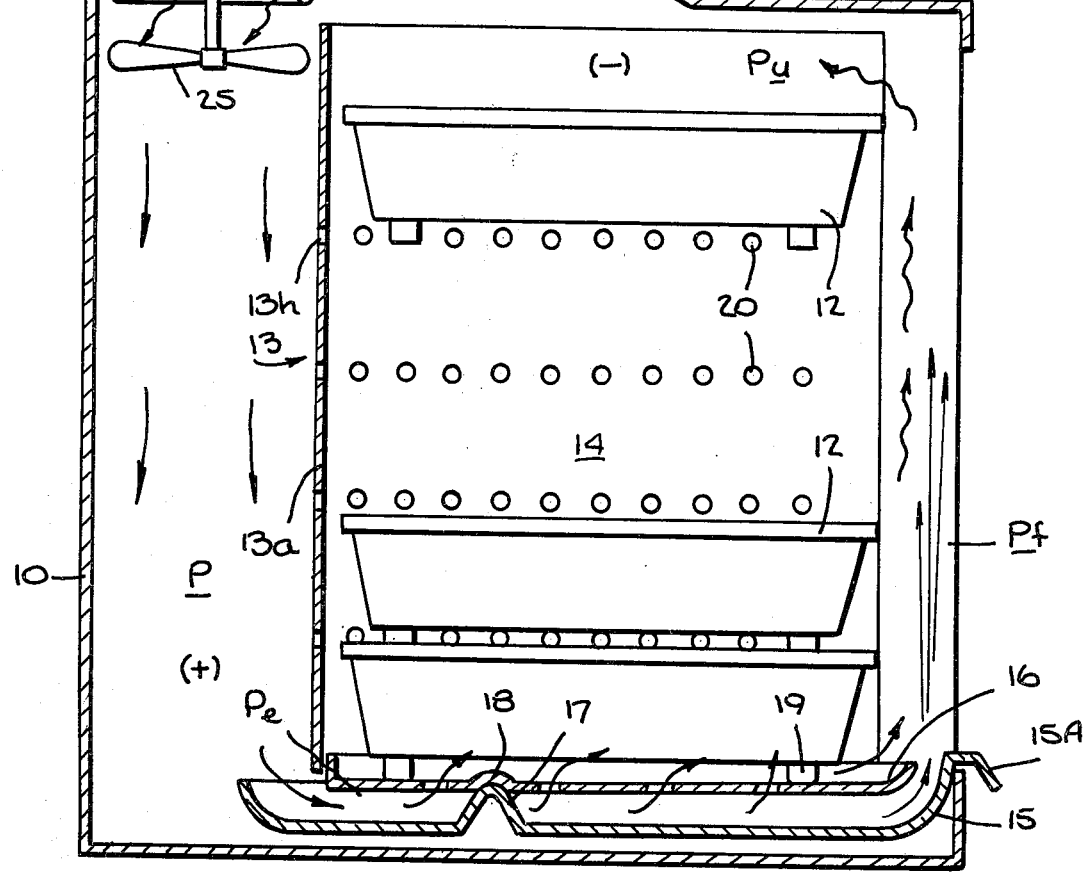

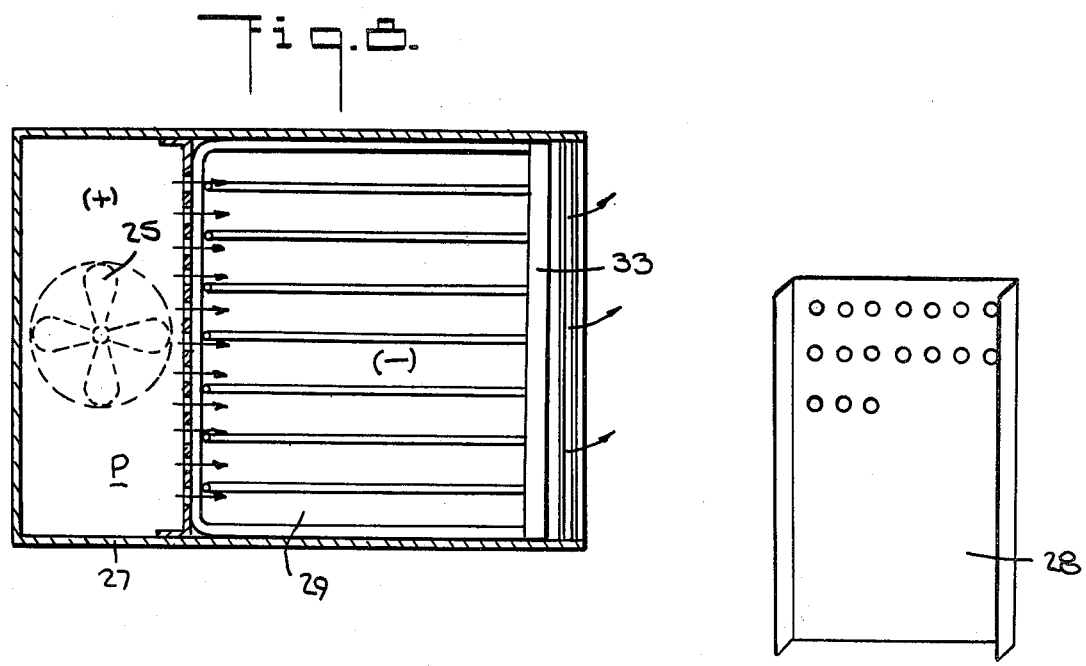
Fig. 8.
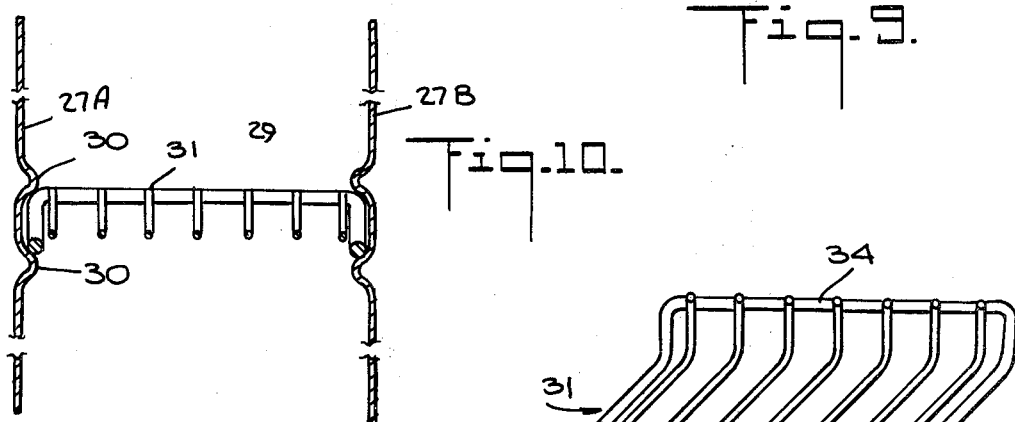
Fig. 9.
Fig. 10.
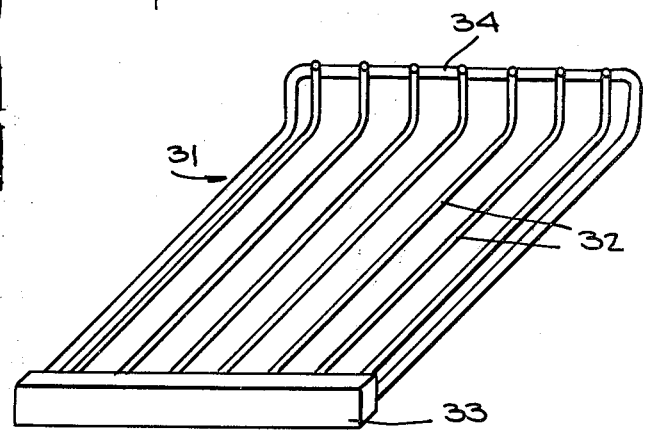
Fig. 11.
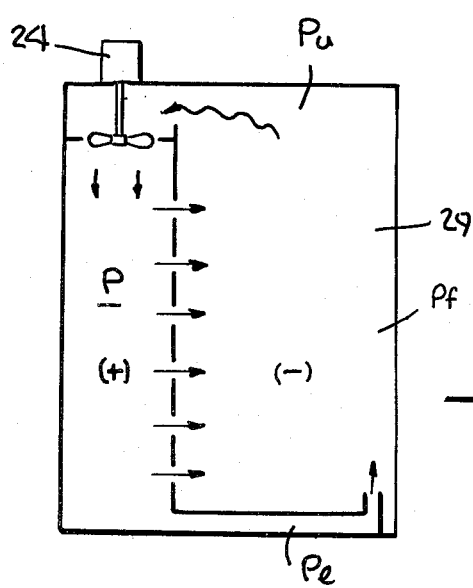
Fig. 12.

COUNTER-TOP UNIT FOR HEATING PACKAGED FOOD

RELATED APPLICATIONS

This application is a continuation-in-part of my copending application Ser. No. 221,208, filed Dec. 30, 1980, now U.S. Pat. No. 4,327,279, which in turn is a continuation-in-part of my copending application Ser. No. 97,787, filed Nov. 27, 1979, said application Ser. No. 97,787 (now U.S. Pat. No. 4,307,286) being a continuation-in-part of application Ser. No. 971,381, filed Dec. 20, 1978 (now U.S. Pat. No. 4,326,497), which is a division of application Ser. No. 809,775, filed June 24, 1977 (now U.S. Pat. No. 4,132,216).

BACKGROUND OF INVENTION

This invention relates generally to hot-air ovens for reheating packages containing pre-cooked food initially in a cold or frozen state, and more particularly to a counter-top unit of this type which is useable in homes and offices and is adapted rapidly to reheat a stack of such packages to a service temperature level and to maintain the food at this level for an indefinite period.

To satisfy the growing need for quickly prepared inexpensive meals, convenience food systems have been developed in which the meals to be later served are first cooked, packaged, and then deep-freezed. When one wishes to eat a particular meal, the selected package is taken out of the freezer and the frozen pre-cooked meal is then thawed and reheated. Typical of such operations is the so-called TV dinner in which a pre-cooked meal in the frozen state is sealed within a serving tray. The dinner is kept in the freezer until there is a demand for it, at which point the TV dinner is thawed and reheated in a microwave oven, a convection oven or whatever heater is available. The term "packages" as used herein is intended to cover any sealed dish, tray, pouch or other hard or soft container having pre-cooked food therein.

In reheating a pre-cooked frozen meal in homes and offices, it is difficult when going from the frozen state to a service level in a conventional hot air oven, to avoid a situation in which the core of the meal is still cold even though the outer layer is hot. When one seeks to ensure that the body of the food is hot throughout, there is a tendency to overheat the meal in the oven and thereby re-cook it, with a resultant loss in nutritional value and flavor. But even when the meal has been heated to a proper serving level, it must be served without delay, for with the typical oven it is virtually impossible to thereafter hold the meal until such time as there is a demand therefor without overheating.

For a convenience food operation to be effective, one must be able not only to reheat the pre-cooked meal to a proper service temperature level within a relatively short period, but one must be able to take into account that in a home and office, the time at which diners are ready to eat may be subject to change. Thus in a typical office having several staff members, all of whom intend to lunch at say noon, it is not at all unusual for one or more of the members to be unavailable until say an hour or so later. Existing ovens for reheating precooked frozen meals cannot cope with this common contingency.

In my copending application Ser. No. 221,208 whose entire disclosure is incorporated herein by reference, there is disclosed a counter-top unit useable in homes and offices for reheating stack of packages containing pre-cooked meals in that they are rapidly brought from the cold or frozen state to a service temperature level and thereafter maintained indefinitely at this level.

The unit disclosed in my copending application Ser. No. 221,208 includes a box-like case having telescoped therein an open-fronted inner box whose walls are spaced from those of the case to define rear and side air spaces therebetween. Mounted within the inner box is a compartment to receive a stack of packages with spacings therebetween. The perforated wall of the compartment is spaced from the rear of the inner box to define a rear plenum. In the heat-up phase, air in the rear space heated to a temperature well above the service level is blown into the plenum, the resultant pressure differential between the plenum and the rear space causing the air to flow at high velocity through the package spacings in the compartment back to the rear space to create a continuous flow loop.

Heat is provided by high-wattage and low-wattage heater elements, both of which are energized in the heat-up phase to provide the required high temperature. However, in the heat-up phase, the operation of the high-wattage element is periodically interrupted whereby the meals are then subjected to pulses of high-temperature air separated by relatively low-temperature intervals during which heat from the outer layer of food is transferred to the intermediate layers and the core thereof to prevent the outer layer from being heated above the service temperature. When the body of the meals reach the service temperature, the unit switches over to a service phase in which only the low-wattage heater element is energized and thermostatically-controlled to maintain the food at the service temperature level for an indefinite period.

A unit in accordance with the present invention acts in a similar manner, but is structurally in a less complicated form.

SUMMARY OF INVENTION

In view of the foregoing, the main object of this invention is to provide a counter-top unit of simple yet efficient design useable in homes and offices for reheating a stack of packages containing pre-cooked meals so that they are brought from the colder frozen state to a service temperature level in a relatively short period and thereafter maintained indefinitely at this level.

Another object of the invention is to provide a unit of the above-type which is highly compact and which may be manufactured at low cost.

A significant advantage of a unit of the above-type is that it makes it possible in an office or similar facility to store a variety of packages containing pre-cooked meals in a freezer, such as fish, meat or vegetable-based meals, and to select from this inventory a group of different meals to be served. The selected packages are transferred to the unit which is turned on about an hour before the lunch or dinner hour so that it is then ready to be served at that hour or at a later period should any diner be delayed for any reason. Since the reheating of the meals does not result in recooking thereof, should a reheated meal not be eaten, it may be returned to the freezer for subsequent use.

Briefly stated, these objects are attained in a counter-top unit for heating packages containing pre-cooked cold food, the unit acting to rapidly heat-up the food to a service temperature level and to thereafter maintain this level. The unit includes a case having an apertured partition therein to form a compartment, accessible from the front of the case for accommodating a stack of food packages with air-flow spaces therebetween. The compartment is spaced from the rear of the case to define a plenum and from the front to define an air curtain passage communicating with upper and lower air passages leading to the plenum.

In operation, air drawn from the upper passage is heated and blown into the plenum to create a pressure differential between the plenum and the compartment, as a result of which the heated air is forced through the partition into the spaces between the packages to heat the food therein, the heated air also flowing in a continuous loop about the compartment through the passages to thermally isolate the compartment. In the heat-up phase, the heated air is in the form of pulsatory wave in which the pulses are at a temperature above the service level separated by lower temperature intervals during which heat from the outer layer of the food is transferred into the body thereof to prevent the food from being heated above the service level. In the subsequent service phase, the temperature of the air is held at the service temperature level.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a first embodiment of a unit in accordance with the invention;

FIG. 2 schematically shows the unit in a section taken vertically therethrough;

FIG. 3 schematically shows the unit in a transverse section taken in the plane indicated by lines 3—3 in FIG. 2;

FIG. 4 is a separate perspective view of the partition which forms the compartment included in the unit for accommodating the food packages;

FIG. 8 is a transverse section taken through a second embodiment of a unit in accordance with the invention;

FIG. 9 is a perspective view of the partition included in the unit;

FIG. 10 shows the wall formations of the unit to create tracks for supporting sliding shelves;

FIG. 11 is a perspective view of one of the shelves;

FIG. 12 is a schematic diagram of the second unit;

Figure 13:
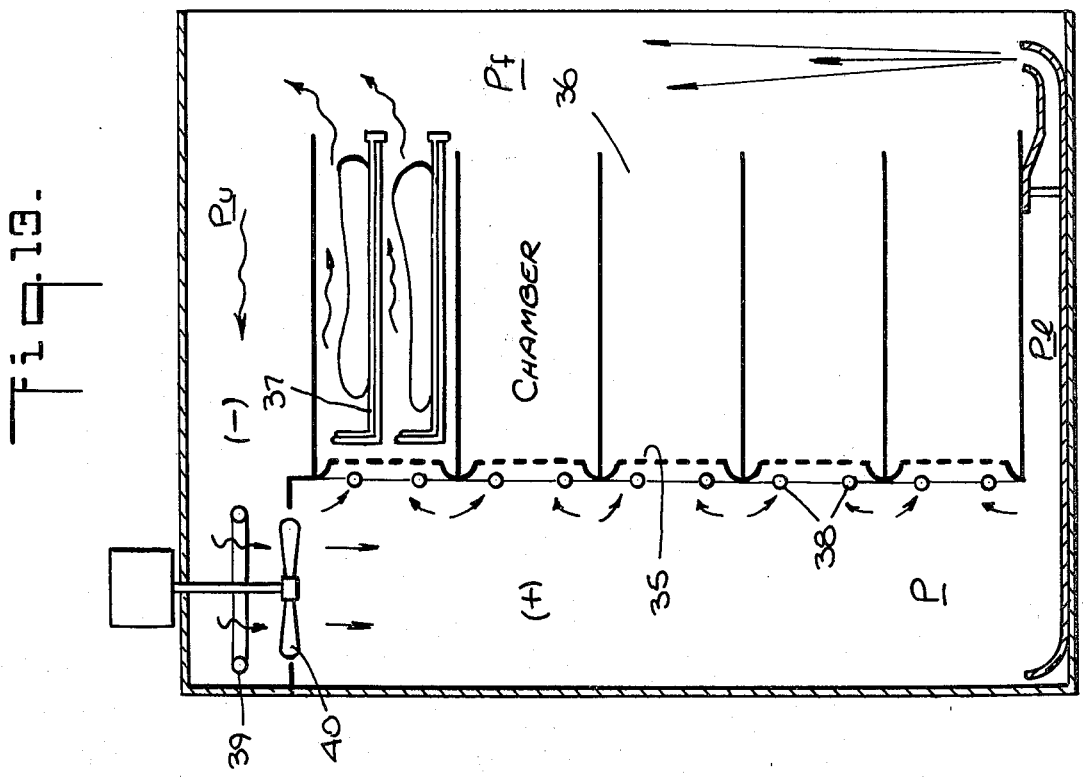

FIG. 13 schematically illustrates a third embodiment of the unit; and

Figure 14:
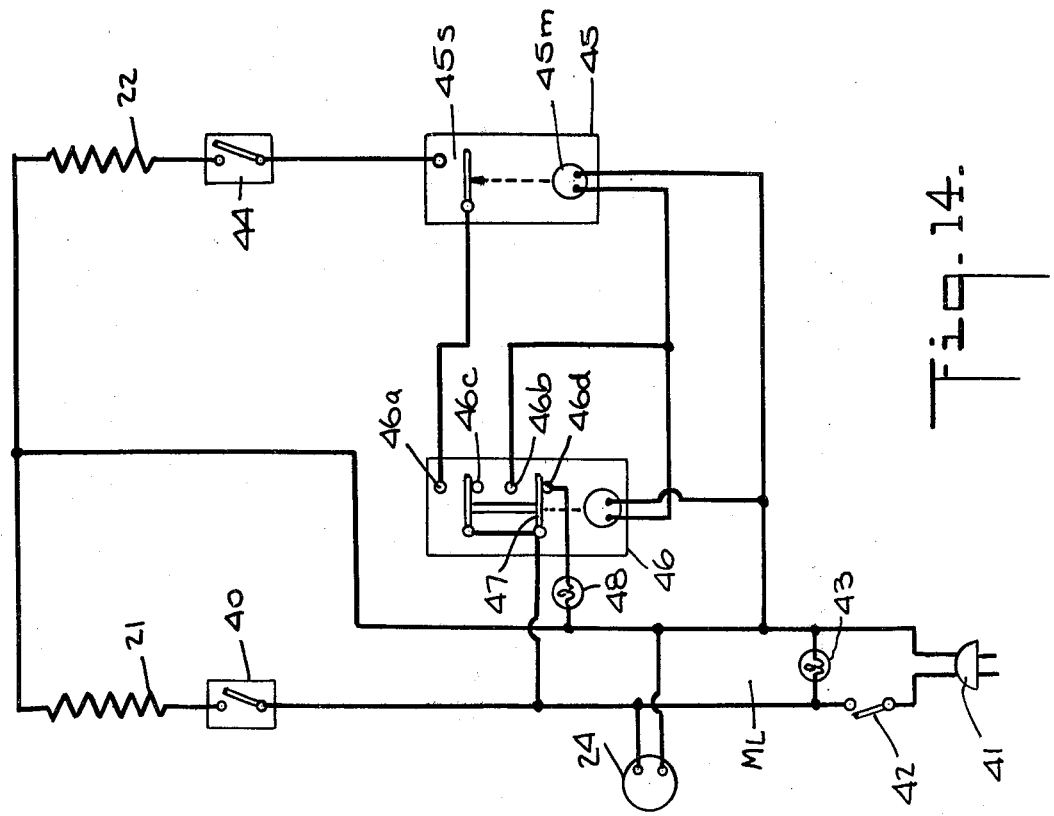

FIG. 14 is the schematic circuit diagram of the electronic control center for the unit shown in FIG. 2.

DESCRIPTION OF INVENTION

Structure of First Embodiment

Referring now to FIG. 1, a unit in accordance with the invention for reheating a stack of packages containing frozen pre-cooked meals includes a box-like case 10 having an open front. The case further includes an upper section adapted to house control devices and including a control panel 11 on which there are mounted switches, indicators and other control elements. Because the unit is both light weight and compact, it is portable and may be carried by means of a handle H.

In practice, the unit may be provided with a front door to close the unit except when food packages are being loaded therein or withdrawn. But because the unit, as will later be evident, generates a front air curtain which thermally isolates the food packages from the exterior sphere, a door is not an essential component thereof. In the absence of a door, one has immediate access to the interior of the unit.

The unit is loaded with a stack of six trays 12 of identical hexagonal shapes, each tray having three angled back sides and three angled front sides. The trays or packages all contain pre-cooked meals in the frozen state, the trays having been taken from a storage freezer and put in the unit about an hour before the scheduled meal-time to allow for adequate heat-up.

While hexagonal trays are shown, the oven is operable with round, rectangular or other tray configurations, as long as the trays fit within the compartment of the unit. The unit is also operable with food packages in soft plastic-pouch form.

In practice, each tray may carry an identifying front label, so that if six different meals are to be served, these will be indicated on the trays. And if for any reason, one or more trays is left over after meal time, they may be returned to the freezer for refreezing subsequent reheating. The unit acts only to reheat and does not recook or otherwise impair the quality of the meals; hence repeated refreezings and reheatings can be tolerated within practical limits.

Figure 5:
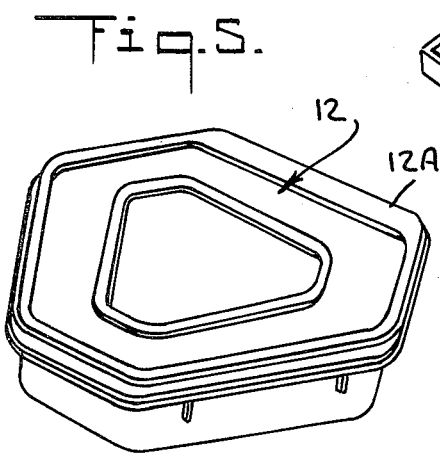
FIG. 5 is a separate perspective view of one of the sealed trays containing a pre-cooked meal.

As shown separately in FIG. 5, each hexagonal tray 12 is provided with a removable lid 12A which seals the contents, the lid being peeled off after the tray has been taken from the unit. Tray 12 may also include bottom spacer elements so that when the trays are stacked one above the other in the unit, air spacings exist therebetween to admit hot air in the manner to be later explained. In the absence of spacer elements, the unit is provided with a rack constituted by an array of wire shelves to support the packages with air spaces therebetween.

Figure 3:
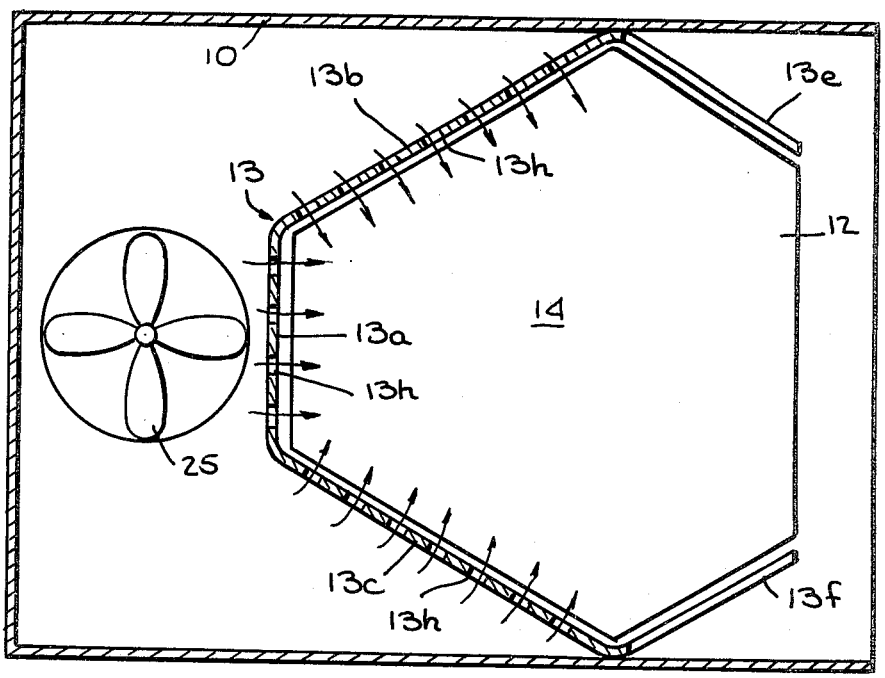
Figure 6:
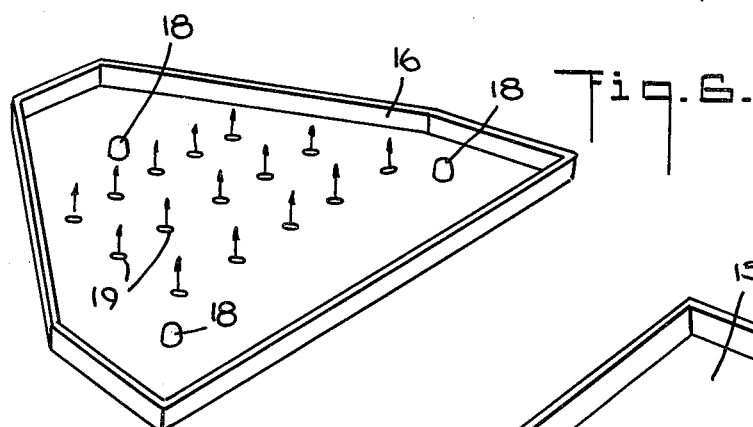
FIG. 6 is a perspective of the base pan above which the stack of packages is supported.

As best seen in FIGS. 2, 3 and 4, mounted within case 10 is a vertical partition 13 to define a compartment 14 adapted to accommodate the stack of trays 12. Partition 13 is composed of three angled side walls 13a, 13b and 13c with ventilation apertures 13h therein, the angles of these sides corresponding to those of the back sides of the hexagonal trays received in the compartment. Thus the trays nest neatly within the compartment. The ventilation holes are placed in horizontal rows running along the walls of the partition, each row being aligned with the space between a set of trays in the stack so that heated air going through these holes is projected into this space.

Partition 12 is provided with front flaps 13e and 13f which are hinged to the edges of side walls 13b and 13c, respectively. These hinged flaps are spring-biased to urge the flaps inwardly against the corresponding front sides of the trays. In order, therefore, to load the compartment or to remove trays therefrom, the flaps must first be swung out. When released, the flaps return to their normal position.

Compartment 14 formed by partition 13 is so mounted within case 10 as to define with the rear wall of the case an air plenum P.

Compartment 14 is spaced from the front of case 10 to define air curtain passage $P_f$ and it is spaced from the top and bottom of the case to define upper and lower air passages $P_u$ and $P_l$. The lower passage $P_l$ is restricted by a shallow duct created by a removable spillage pan 15 over which lies a base pan 16.

Thus the oven structure includes a continuous flow loop in which air blown into plenum P is caused to flow through the restricted lower passage $P_l$ into the air curtain passage $P_f$ and from there back to the plenum through the upper passage $P_l$.

When the oven is designed for food packages other than the hexagonal trays illustrated, partition 13 is configured to contour to these packages. Thus should round trays be used, the partition will then have an arcuate form.

Figure 7:
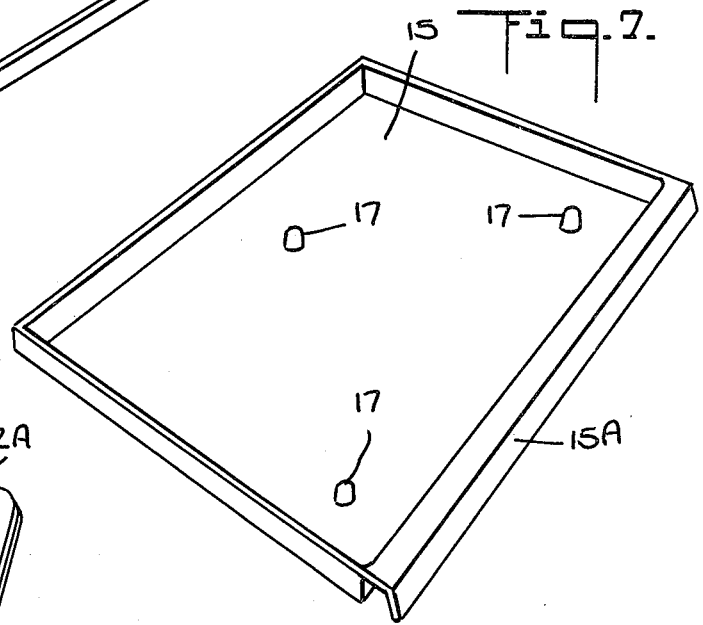
FIG. 7 is a perspective of the spillage pan which lies below base pan.

As best seen in FIG. 7, spillage pan 15, which may be of aluminum, has a rectangular shape and a rolled-over front wall 15A that functions as a handle to facilitate removal of the pan from the unit when cleaning is necessary. Pan 15 is also provided with a set of punched-out spacer posts 17 on which base pan 16 rests. Base pan 16, which has a hexagonal form similar to that of the stack of trays lying thereover, is provided with a set of posts 18 which act to create an air space under the lowermost tray 12 in the stack. Pan 16 is also provided with an array of holes 19 through which hot air from the lower passage $P_l$ may flow.

When the trays in the stack include spacer elements, then these create spaces through which hot air is free to flow to heat the meals. But in the absence of such spacer elements, installed in compartment 14 is a rack having an array of wire shelves 20 to support trays 12 with air spaces therebetween. When the food packages are in round tray, pouch or any other configuration, the shelves serve to support these packages in a vertical stack with spaces therebetween.

Disposed at the junction of the plenum P and upper air passage $P_u$ at the upper rear of case 10 are two electrical resistance heater elements 21 and 22 in coil form having different wattage ratings—one being a low-wattage element (i.e., 300 watts), and the other a high wattage element (i.e., 1000 watts). Supported on armature shaft 23 of an external motor 24 is a propeller fan 25, the shaft going through the heater coils. The heater elements and the motor are operated through an electronic control center 26 which includes timers, relays and other control means to turn on the fan and selectively energize the resistance elements in accordance with the operating program of the unit. In practice, the motor and control center may be housed within the case in a manner isolating these components from the heater elements.

Operation of Unit

When fan 25 is driven at high speed, it serves to draw air from the upper air passage $P_u$ to blow this air into plenum P, the air being heated by elements 21 and 22 in a manner to be later described. Because of the flow restriction formed by pans 15 and 16 in the lower air passage, the hot air in plenum P is under positive pressure, whereas the air in compartment 14 containing the stack of food packages is then under negative pressure.

This gives rise to a pressure differential causing hot air to be projected through the holes in partition walls 13a, 13b and 13c of compartment 14 and to flow at high velocity through the spacings between the trays in the stack. This high velocity flow gives rise to the rapid transfer of heat from the hot air stream to the cold food in the trays.

At the same time, the hot air under positive pressure in plenum P is forced through the restriction duct in lower passage $P_l$ into front passage $P_f$ from which the air is drawn into upper passages $P_u$ back into plenum P, thereby creating a continuous recirculating flow loop about compartment 14 which thermally isolates this compartment. The air flowing across the front passage functions as an air curtain, and because of this one can operate the unit without a front door and reach into the compartment to remove trays therefrom without any significant heat loss. The space under the bottom tray 12 in the stack is treated by air flowing through the holes in base pan 16.

The hot air passing horizontally at high velocity through the spaces between trays 12 is directed toward the front air curtain, but because of the multitude of holes in partition 13, this horizontal flow tends to be turbulent and does not, therefore, impinge on the air curtain with sufficient force to disrupt this curtain.

If hot air flow in the unit were interrupted, because the temperature thereof is much above the service level, the outer layer of the food would, in short order, heat up to a level resulting in recooking or scorching of the meal, whereas the intermediate layers and the core would still lie below the service temperature.

In order, therefore, to rapidly heat up the pre-cooked meals to a level not in excess of the service temperature level and to bring about a uniform distribution of heat in the food body, in a unit in accordance with the invention, a heat-up phase of controlled duration is provided. In the heat-up phase, the energization of the high-wattage heater element 22 is periodically interrupted, whereas the energization of the low-wattage element 21 is uninterrupted to produce very hot air pulses whose temperature is above the service level separated by relatively low-temperature intervals. To this end, control center 26 functions by means of a motorized switching mechanism or equivalent electronic expedients to turn high-wattage heater elements 21 "on" and "off" periodically, say, 30 seconds "on" and 30 seconds "off" in the course of each operating cycle during the heat-up phase.

While the temperature of the hot air pulses is very high and above the service temperature level, because during the low-temperature intervals heat is transferred from the outer layer of the food body to the intermediate layer and from there to the core of the body, this brings about a reduction in the temperature of the outer layer which prevents excessive heat-up thereof.

And because of the large heat differential between the hot air pulses and the outer food layer, rapid heat transfer takes place therebetween during the pulse periods even as the temperature of the outer layer approaches the service temperature level; for at this level there is still a large heat differential.

Thus it becomes possible with pulsatory wave heating during the heat-up phase to rapidly heat up the meals in the trays in a relatively short period; i.e., an hour or less. Control center 26 includes a timer that is pre-set so that upon completion of the heat-up phase, say, after 45 or 60 minutes, the system is switched over to operate continuously with the low wattage heater 21 "on". Heater 21 is then thermostatically governed to maintain the interior temperature of the unit at the service temperature for an indefinite period. A light indicator on the control panel is energized when the unit switches over to the service phase, thereby indicating that the meals are then in condition to be dispensed to diners.

Second Embodiment

Referring now to FIGS. 8 to 11, there is shown a second embodiment of a unit in accordance with the invention which is of particular advantage in connection with soft food packages such as pouches, although it may be used with other types of packages.

The box-like open-front case 27, in this instance, is divided by a single wall apertured partition 28 into a rear plenum P and a food-receiving compartment 29. The arrangement is such as to define below the compartment a restricted lower flow passage $P_1$ which leads from plenum P into a front air curtain passage $P_f$ that provides a return path to plenum P through an upper air flow passage $P_u$, just as in the first embodiment. The fan 25 and associated heaters are the same as in the first unit to provide heat-up and service phases.

The side walls 27A and 27B of case 27, as shown in FIG. 10, are embossed or corrugated to create in compartment 29 a series of horizontal shelf track pairs 30 adapted to support sliding shelves 31 by their edges. As shown in FIG. 11, each shelf is composed of a grid of metal rods 32 connected at their front end to a plastic handle 33, the rods at the rear of the shelf being bent to form a right angle ledge 34.

Thus the user is able to place a pouch or other package on each shelf and to slide the pouch into the compartment for heating and to slide it out for removal and serving. The electronic control center associated with this unit is the same as in the first unit and functions in the same manner to rapidly heat up the cold pre-cooked food to a service temperature level and to maintain this level for an indefinite period.

Third Embodiment

In the unit shown in FIG. 13, the case thereof is divided by an apertured partition 35 into a rear plenum P and a compartment 36, which in turn is subdivided into a series of chambers 1 to 5, one above the other, each containing two sliding shelves 37 for receiving food pouches.

Behind each chamber in a recess in the apertured partition is a chamber heater 38, the unit being also provided with a central heater 39 associated with motor-driven fan 40. Thus a user may select for serving the food pouches in a given chamber without subjecting the pouches in the other chambers to a pulsatory heat-up action. The pouches in all chambers are always subjected to relatively low-temperature heating from central heater 39.

With this arrangement, each chamber is provided with its own timer (not shown) to periodically energize the associated chamber heater to produce a pulsatory wave for a heat-up phase whose duration is appropriate to the food. In this way, the various chambers may contain food having disparate thermal characteristics, each requiring a different heat-up time.

Electronic Control Center

Referring now to FIG. 14 showing the schematic circuit of electronic control center 26 in FIG. 2, it will be seen that low wattage heater 21 is connected in series with a settable thermostat 40 to the power line plug 41 at the end of main line ML through a master switch 42. A pilot light 43 is turned on when master switch 42 is closed. In practice, assuming a 500 watt heater 21, thermostat 40 can be set to maintain heater 21 operative at a selected level in a temperature range of 155° to 170° F.

Connected across main line ML is the fan motor 24, so that when pilot light 43 is "on", this indicates that motor 24 is operative as well as heater 21. The high-wattage heater 22 is connected at one end in series with a thermostat switch 44 and the periodically-actuated switch 45S of a cycle-timer 45 to the normally-open contact 46a of a manually-operated variable timer 46 whose double armature 47 is connected to one end of main line ML, the other end of heater 22 being connected directly to the other end of the main line.

Thus heater 22 is energized only when armature 47 engages contact 46a and switch 45S of the cycle-timer 45 is closed. Assuming that heater 22 is a 750 watt heater, in practice thermostat 44 will maintain this heater at a selected level within a 195° to 204° F. range. The motor 45M of cycle-timer 45 and the motor 46M of variable timer 46 are both connected across power line ML through normally open contact 46b and armature 47, so that these motors are initially de-energized.

When, however, double armature 47 is manually pushed up to engage normally open contacts 46a and 46b, motors 45M and 46M are then energized for a period determined by the adjusted timing period of timer 46. In practice, this timing period has a maximum total time of 1 hour and 30 minutes. When timer 46 times out, armature 47 reverts automatically to the normally closed contacts 46c and 46d.

When motor 45 operates, it periodically actuates switch 45S of the cycle-timer, each cycle running, say, for about 3 minutes during which heater 22 is energized for, say, 1.5 minutes and de-energized for 1.5 minutes. Thus the heat produced by heaters 21 and 22 is a pulsatory thermal wave pattern whose peak pulse temperature is determined by the combined effect of heaters 21 and 22 when both heaters are on and whose intervals between pulses are determined by the effect of heater 21 alone.

When timer 46 times out to de-energize both motors, a pilot light 46 turns on to indicate the completion of the heat-up phase, the light remaining on for the subsequent service phase in which only low-wattage heater 21 is energized.

Modifications

In FIG. 3, each chamber is shown as containing two food pouches, one above the other. In practice, these two pouches may, with an appropriate common shelf arrangement, be placed one behind the other. Because of this chamber arrangement, a consumer can, at his own election, actuate the pulsed heater for a selected chamber without disturbing the operating cycles of the other chamber, so that the food packages in each chamber can be individually treated.

When each chamber contains two pouches, one may be a pouch with an entree such as a steak, and the second pouch with a side dish, such as a vegetable, spaghetti or rice. In this way, the pouches may be stored in a frozen state and a customer can select his entree and side dishes and put the selected pouches in the chamber of the unit to provide a full hot meal.

It is to be noted that in units in accordance with the invention, the high-velocity air flow loop which envelops the food compartment and which includes a front air curtain operates continuously and without interruption; whereas the temperature of the air in this loop, in the heat-up phase, is pulsed so that in each cycle the air during the pulse period is at a high temperature and in the interval is at a lower temperature. As a consequence, the air flow loop is never disrupted, and the food compartment always lies within the loop and is thermally isolated from the atmosphere.

In the units shown herein, the fan which produces the continuous flow loop and the heaters which heat the flowing air, either continuously in the service phase or periodically in the heat-up phase, are incorporated in the structure. One can accomplish the same result in an arrangement in which the heaters and fan are placed in a self-contained heat source remote from the unit including the food compartment, the same source being used to supply several units.

While the units described herein are particularly useful in homes and offices in which large commercial ovens of the type disclosed in my earlier patent applications and patents are inappropriate, these units are also useful in motels, hospitals and for other sites where the need exists for a facility to dispense heated meals at odd hours without service personnel. Thus these units may be installed in motel rooms to operate in conjunction with corridor vending machines to supply guests with entrees, side dishes and other selected combinations stored in the frozen state, the selected items purchased from the machines then being placed in the room unit to be heated up and served.

Also, while the units illustrated include a compartment which accommodates a single stack of food packages, the compartments may be arranged to accommodate two such stacks in side-by-side relation.

While there have been shown and described preferred embodiments of a counter top unit for heating packaged food in accordance with the invention, it will be appreciated that many changes and modifications may be made therein without, however, departing from the essential spirit thereof.

I claim:

1. A unit for reheating packages containing cold precooked meals, the unit being adapted to rapidly heat up the meals to a service temperature level and to thereafter hold the meals at this level, said unit comprising:

A a case having an apertured partition mounted therein to form a compartment accessible from the front of the case for accommodating a stack of said food packages with air-flow spaces therebetween, the compartment being spaced from the rear of the case to define a plenum and the front to define an air curtain passage which communicates with upper and lower air passages leading to the plenum; and B heating means to heat air drawn from the upper passage and means to blow the heated air into the plenum to create a pressure differential between the plenum and the compartment, as a result of which the heated air is forced through the partition into the flow spaces between the packages to heat the food therein, the heated air also flowing from the plenum in a continuous recirculating loop into the lower air passage, from which the air goes through the air curtain passage and the upper passage back to the plenum to thermally isolate the compartment.

2. A unit as set forth in claim 1, wherein said air is heated by low and high wattage heater elements, both of which are energized in a timed heat-up phase, only one of which is energized in a subsequent service phase, the energization of the high-wattage element in the heat-up phase being periodically interrupted to subject the packages to the hot air pulses whose temperature is above the service level separated by relatively low temperature intervals during which heat is transferred from the outer layer of the meals to the intermediate layers and core thereof, the resultant reduction in the temperature of the outer layer during these intervals preventing overheating thereof.

3. A unit as set forth in claim 1, wherein said packages are sealed trays having a hexagonal form.

4. A unit as set forth in claim 3, wherein said compartment is composed of three angled walls having holes therein, said walls corresponding to the three back sides of the trays.

5. A unit as set forth in claim 4, wherein said compartment further includes spring-biased flaps hinged to the side walls of the compartment.

6. A unit as set forth in claim 1, further including a rack for inclusion in said compartment having an array of wire shelves to receive said packages.

7. A unit as set forth in claim 1, further including a restriction in said lower passage constituted by a spillage pan spaced from a base pan.

8. A unit as set forth in claim 1, wherein the side walls of the case have tracks thereon to receive slidable shelves for supporting the packages in the compartment.

9. A unit as set forth in claim 8, wherein said shelves are formed by a grid of metal rods.

10. A unit as set forth in claim 9, wherein said food packages are in pouch form.

11. A unit as set forth in claim 8, wherein said compartment is sub-divided into a stack of chambers, each adapted to receive at least one package, and further including means to heat the air flowing into each chamber independently of the other chambers.

* * * * *